US011537401B2

(12) United States Patent
Lassen

(10) Patent No.: US 11,537,401 B2
(45) Date of Patent: Dec. 27, 2022

(54) TRAP SUB-PORTIONS OF COMPUTER-READABLE INSTRUCTIONS AND RELATED SYSTEMS, METHODS, AND APPARATUSES

(71) Applicant: Microchip Technology Incorporated, Chandler, AZ (US)

(72) Inventor: Jacob Lunn Lassen, Saupstad (NO)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/650,621

(22) Filed: Feb. 10, 2022

(65) Prior Publication Data

US 2022/0261250 A1 Aug. 18, 2022

Related U.S. Application Data

(60) Provisional application No. 63/148,060, filed on Feb. 10, 2021.

(51) Int. Cl.
*G06F 11/07* (2006.01)
*G06F 9/32* (2018.01)
(Continued)

(52) U.S. Cl.
CPC .......... *G06F 9/321* (2013.01); *G06F 11/0757* (2013.01); *G06F 11/0796* (2013.01);
(Continued)

(58) Field of Classification Search
CPC .. G06F 11/0757; G06F 11/28; G06F 11/3471; G06F 11/3636
See application file for complete search history.

(56) References Cited

U.S. PATENT DOCUMENTS 4,910,663 A * 3/1990 Bailey ................. G06F 11/3676
714/E11.212
5,134,701 A * 7/1992 Mueller .............. G06F 11/3644
703/22

(Continued)

FOREIGN PATENT DOCUMENTS

EP 3223157 A2 * 9/2017 .......... G06F 11/1012

OTHER PUBLICATIONS

International Search Report from International Application No. PCT/US2022/070615, dated May 12, 2022, 4 pages.

(Continued)

*Primary Examiner* — Joseph O Schell
(74) *Attorney, Agent, or Firm* — TraskBritt

(57) ABSTRACT

Trap sub-portions of computer-readable instructions and related systems, methods, and devices are disclosed. A processing circuit includes a processing core including a program counter to cycle through addresses and a data storage device including computer-readable instructions stored thereon. Sub-portions of the computer-readable correspond to subroutines. Locations of the sub-portions within the data storage device are associated with the addresses. A first sub-portion at a first location within the data storage device is indicated by a first address. First trap sub-portions at first trap locations are indicated by first trap addresses. The first trap addresses are different from the first address by only a single bit. The first trap sub-portions instruct the processing core to execute first trap subroutines to jump to the first address or back to themselves.

20 Claims, 8 Drawing Sheets

(51) Int. Cl.
   *G06F 11/28* (2006.01)
   *G06F 11/10* (2006.01)
   *G06F 11/34* (2006.01)
   *G06F 11/36* (2006.01)

(52) U.S. Cl.
   CPC .......... *G06F 11/1012* (2013.01); *G06F 11/28* (2013.01); *G06F 11/3471* (2013.01); *G06F 11/1016* (2013.01); *G06F 11/1048* (2013.01); *G06F 11/3636* (2013.01)

(56) References Cited

U.S. PATENT DOCUMENTS

| | | | |
|---|---|---|---|
| 5,136,590 A | 8/1992 | Polstra et al. | |
| 5,495,598 A * | 2/1996 | Byers | G06F 9/30058 714/E11.166 |
| 6,134,682 A * | 10/2000 | Oakland | G06F 11/221 714/730 |
| 6,370,655 B1 * | 4/2002 | Lin | G06F 11/1433 714/719 |
| 9,129,062 B1 * | 9/2015 | Adams | G06F 11/3644 |
| 2004/0153768 A1 | 8/2004 | Daemmrich et al. | |
| 2007/0250703 A1 * | 10/2007 | Giraud | G06F 21/55 713/154 |
| 2012/0265973 A1 * | 10/2012 | Hering | G06F 9/226 712/229 |
| 2014/0173361 A1 * | 6/2014 | Meaney | G06F 11/221 714/47.2 |

OTHER PUBLICATIONS

International Written Opinion from International Application No. PCT/US2022/070615, dated May 12, 2022, 9 pages.

* cited by examiner

TRAP SUB-PORTIONS OF COMPUTER-READABLE INSTRUCTIONS AND RELATED SYSTEMS, METHODS, AND APPARATUSES

CROSS-REFERENCE TO RELATED APPLICATION

This application claims the benefit under 35 U.S.C. § 119(e) of the priority date of U.S. Provisional Patent Application Ser. No. 63/148,060, filed Feb. 10, 2021, the entire disclosure of which is hereby incorporated herein by this reference.

TECHNICAL FIELD

This disclosure relates generally to trap sub-portions of computer-readable instructions, and more specifically to safe operation of safety critical products responsive to trap sub-portions of computer-readable instructions.

BACKGROUND

Stuck-at faults in program counters (PCs) of processing circuits may occur responsive to damage or imperfection of one or more semiconductor devices (e.g., transistors) of the PC. A "stuck-at fault" is an error condition where the output of a bit remains fixed at a particular logic level, irrespective of programming. For example, high-energy particles (e.g., radiative particles such as alpha particles, beta particles, and gamma particles) may penetrate packaging materials of an integrated circuit device and strike a semiconductor chip, which may damage the circuit implementing the PC function. Similar problems may be caused by an address bus, where one or more lines are stuck-at a particular value.

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1:
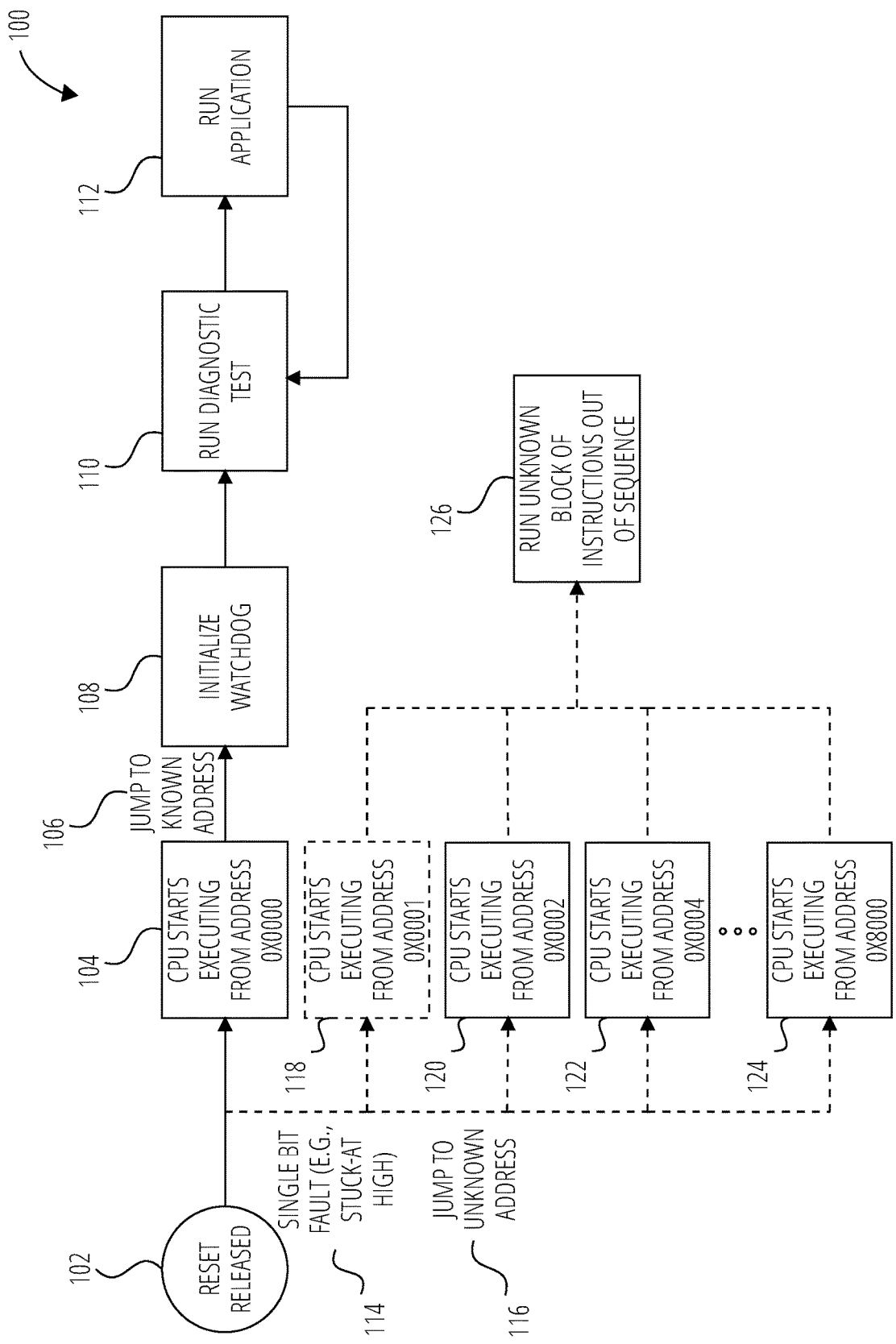
FIG. 1 is a flow diagram illustrating problems that may occur responsive to a stuck-at fault in a method of operating a processing circuit.

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example or this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art will understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may include one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

In safety critical products it is required to test or detect (e.g., diagnose) for faults in processing circuits (e.g., microcontrollers) and to be able to ensure the safe operation of the product. By way of non-limiting example, a safety critical product that involves control of a valve to enable and disable flow of a flammable fluid through the valve may perform in an unpredictable and dangerous way if a stuck-at fault occurs in a program counter of a processing circuit or an address bus. The flow of flammable fluid at an undesirable time may result in injury or death to one or more persons and/or damage or destruction to equipment, facilities, and/or the environment.

Recommended and sufficient diagnostics tests are specified by standards such as IEC 60730. IEC 60730, Annex H, Table H.1 specifies that diagnostic tests must identify stuck-at faults in the program counter (PC).

Diagnostic tests for stuck-at faults in the program counter are performed by testing that no bits are stuck. A watchdog timer is used to reset the MCU, or other processor of a safety critical device, if an unexpected program flow/timing occurs to catch program counter stuck-at faults that emerge at run-time, and which are not detected by the diagnostic test.

If a bit is stuck in the program counter or in an address bus, however, the processing circuit may not be able to execute instructions in an expected sequence. As a result, the diagnostic test may not be run, or may not run as intended. The fault detection mechanism is affected by fault and can therefore not be considered an independent safety mechanism. The successful execution of the diagnostics test require that there are no stuck-at faults in the program counter, which means that the fault detect mechanism is not fulfilling its purpose and it cannot be rightfully claimed that it successfully contributes to the safety of the system. In case of a stuck-at fault in the program counter the watchdog timer is the only and last line of defense, but since the watchdog timer is often initialized by software, the successful initialization of the watchdog timer may be conditioned on whether or not there are stuck-at faults in the program counter. In reality this means that the fault detection capability of a software initialized watchdog timer is also compromised, as it is also impacted by the fault. The inventor of this disclosure now appreciates that any assumption that a combination of a software initialized watchdog timer and diagnostics that verify that there are no stuck-at faults will work is unsafe because a stuck-at fault may prevent the initialization of the watchdog timer, the diagnostics, or both, from working properly.

Many safety critical systems may use a program counter stuck-at diagnostic method that does not necessarily work in reality, and is therefore potentially unsafe. Program counter stuck-at trapper examples disclosed herein may catch substantially all single-bit stuck-at faults of the program counter regardless of whether the watchdog timer is initialized by software to operate as intended.

FIG. 1 is a flow diagram illustrating problems that may occur responsive to a stuck-at fault in a method 100 of operating a processing circuit (e.g., a CPU). If a bit is stuck high, half of the instruction addresses will be inaccessible to the processing circuit. Absent any stuck-at bits (e.g., stuck-at high bits or stuck-at low bits) the method 100 may proceed under a normal operational flow, which is shown using solid lines. Broken lines, by contrast, illustrate abnormal operational flow of the method 100 responsive to a single bit fault 114 (e.g., a stuck-at high fault).

Under normal operation (no stuck-at faults) the method 100 may include, at operation 102, releasing a reset. At operation 104 the method 100 includes the CPU starting execution from address 0x0000. Since no stuck-at faults interfere with the program counter pointing to the address 0x0000, the program associated with the address 0x0000 may execute, and the method 100 may accordingly jump to a known address at operation 106 to initialize a watchdog timer at operation 108. At operation 110 the method 100 may include running a diagnostic test (e.g., a stuck-at diagnostic test for the program counter and/or the address bus to test for stuck-at faults). Responsive to passage of the stuck-at diagnostic test the method 100 may proceed to operation 112, at which point the method 100 includes running an application. The method 100 may periodically return to operation 110 to run the stuck-at diagnostic test and return to operation 112 to run the application during normal operation.

If the program counter, however, experiences a stuck-at fault such as the single bit fault 114, responsive to the reset being released at operation 102 the method 100 may include jumping to an unknown address at operation 116. Accordingly, rather than starting execution from address 0x0000 in operation 104, the method 100 may instead include the CPU starting execution from a different address that is one bit off of address 0x0000. As specific non-limiting examples, at operation 118 the CPU may start executing from address 0x0001, at operation 120 the CPU may start executing from address 0x0002, at operation 122 the CPU may start executing from address 0x0004, or at operation 124 the CPU may start executing from address 0x8000. As a result, at operation 126 the CPU may run an unknown block of instructions out of sequence without initializing the watchdog timer (operation 108), without running a stuck-at diagnostic test for the program counter (e.g., operation 110), and without running the application (operation 112). In other words, responsive to the single bit fault 114, the method 100 may never reach operation 108 (initializing the watchdog timer), operation 110 (running stuck-at fault diagnostic tests for the program counter), or operation 112 (running the application).

As illustrated in FIG. 1, any of various different unknown blocks of instructions associated with any of various addresses may end up being executed at operation 126 responsive to the single bit fault 114. For example, let A be a set of instruction addresses and F be a stuck-at fault value of 2^n, where n is the bit address of the bit that is stuck high. Consequently, if a stuck-at high bit fault is present all addresses A will be executed as A|F (where | is the bit-wise OR operator) rather than as A. For example, if bit 0 is stuck-at high, the instruction address 0x0000 is replaced with 0x0001, 0x0002 is replaced with 0x0003, and so on. A similar problem applies if a program counter bit is stuck low.

Characteristics of a single stuck-at fault include:
Only half of the instruction addresses will be accessible to the processing core
A random instruction has a 50% probability of mis-executing
Statistically, there is a 99.9% chance of mis-execution after just ten instructions (assuming a unified probability for each address to be accessed)

A characteristic of a stuck-at high includes that address 0x0000 will always mis-execute. A characteristics of a stuck-at low includes that address 0x0000 will always execute correctly and address 0xFFFF will always mis-execute.

Figure 2:
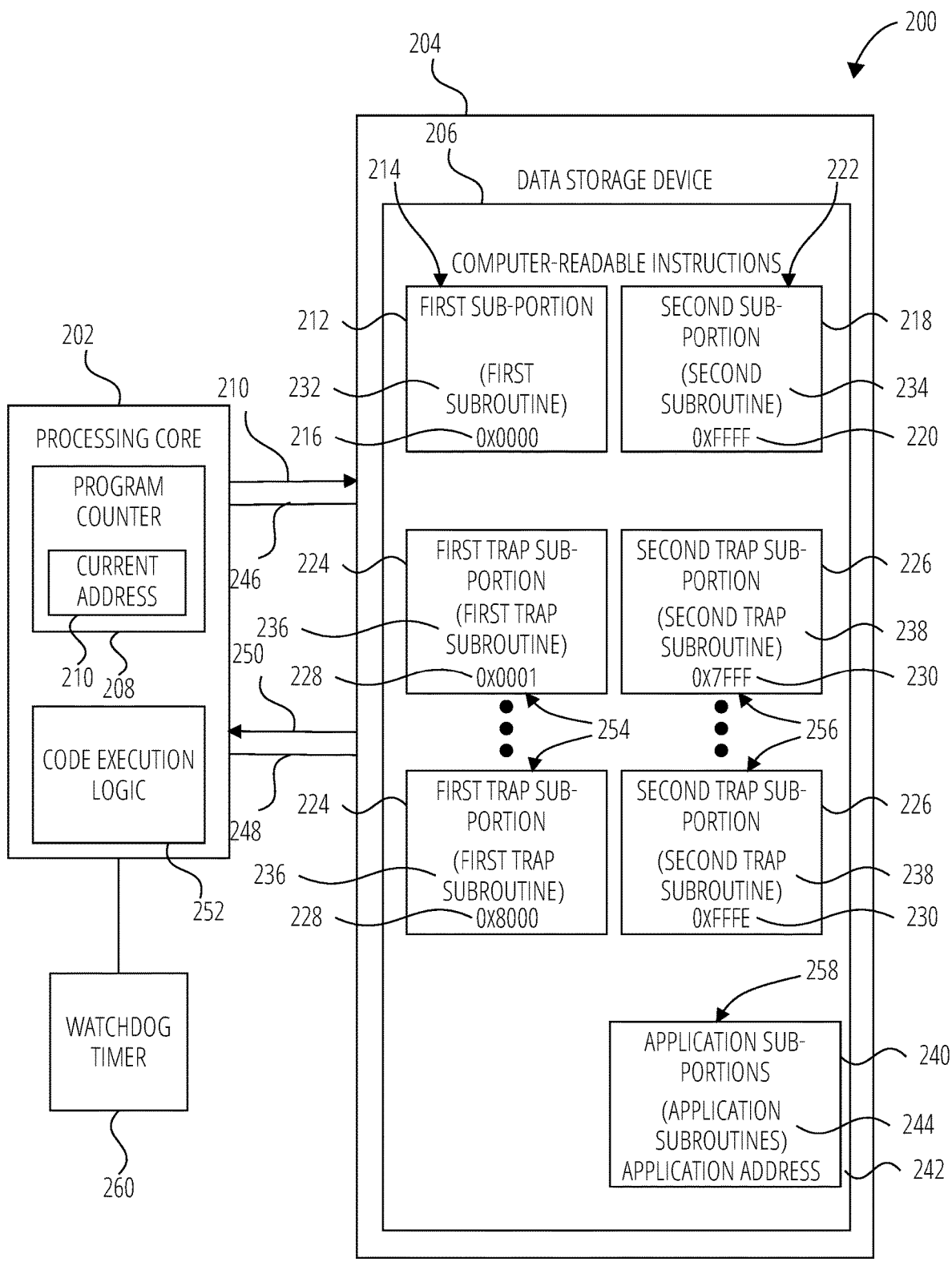
FIG. 2 is a block diagram of a processing circuit, according to some examples.

FIG. 2 is a block diagram of a processing circuit 200, according to some examples. The processing circuit 200 includes a processing core 202 and a data storage device 204. The processing core 202 includes a program counter 208 to cycle through addresses. A current address 210 is indicated at the program counter 208 of FIG. 2. The processing core 202 also includes a code execution logic 252 to execute computer-readable instructions 206 stored by the data storage device 204.

The computer-readable instructions 206 include sub-portions of the computer-readable instructions (e.g., first sub-portion 212, second sub-portion 218, first trap sub-portions 224, second trap sub-portions 226, and application sub-portions 240). The sub-portions of the computer-readable instructions 206 are to instruct the processing core 202 to execute subroutines. Each sub-portion of the computer-readable instructions 206 corresponds to one of the respective subroutines. For example, the first sub-portion 212 corresponds to a first subroutine 232, the second sub-portion 218 corresponds to a second subroutine 234, the first trap sub-portions 224 correspond to first trap subroutines 236, the second trap sub-portions 226 correspond to second trap subroutines 238, and application sub-portions 240 correspond to application subroutines 244.

The sub-portions of the computer-readable instructions 206 are located at locations of the data storage device 204. As used herein, the term "location," when used with reference to a location of data or computer-readable instructions stored in a data storage device, refers to logical locations, physical locations, or both. By way of non-limiting examples, the locations may correspond to physical locations of physical data storage elements (e.g., memory cells) that store the corresponding sub-portions of the computer-readable instructions 206, or logical locations corresponding to such physical locations. For example, the first sub-portion 212 is stored at a first location 214, the second sub-portion 218 is stored at a second location 222, the first trap sub-portions 224 are stored at respective first trap locations 254, the second trap sub-portions 226 are stored at respective second trap locations 256, and the application sub-portions 240 are stored at respective application locations 258.

The locations of the sub-portions of the computer-readable instructions 206 are indicated using addresses. For example, the first sub-portion 212 is located at the first location 214, which is indicated using a first address 216 (e.g., 0x0000). The second sub-portion 218 is located at the second location 222, which is indicated using a second address 220 (e.g., the bootend or end of memory address 0xFFFF corresponding to a bootend or end of memory location). The first trap sub-portions 224 are located at the respective first trap locations 254, which are indicated using respective first trap addresses 228 (e.g., 0x0001, . . . 0x8000). The second trap sub-portions 226 are located at the respective second trap locations 256, which are indicated using respective second trap addresses 230 (e.g., 0x7FFF, . . . , 0xFFFE), and the application sub-portions 240 are located at the respective application locations 258, which are indicated by respective application addresses 242 (e.g., one of the application addresses being a start of application address).

In operation, the current address 210 cycles through addresses corresponding to the sub-portions of the computer-readable instructions 206 stored on the data storage device 204. The processing core 202 provides a current address 210 to the data storage device 204 (e.g., via an address bus 246). In response to the current address 210, the data storage device 204 provides a current sub-portion 250 (i.e., one of the sub-portions of the computer-readable instructions 206 that is at a location indicated by current address 210) to the processing core 202 (e.g., via a data bus 248).

The first address 216 comprises a plurality of bits, and each of the first trap addresses 228 differ from the first address 216 by a single respective bit. By way of non-limiting example, the first address 216 may be a consecutive series of zeros. Since the first trap addresses 228 are each different from the first address 216 by only a single bit, where the first address 216 is 0x0000 (hexadecimal, which is equal to 16 consecutive zeros in binary), the first trap addresses 228 may be 0x0001, 0x0002, 0x0004, 0x0008, 0x0010, 0x0020, 0x0040, 0x0080, 0x0100, 0x0200, 0x0400, 0x0800, 0x1000, 0x2000, 0x4000, and 0x8000. The first trap sub-portions 224 instruct the processing core 202 to execute the respective first trap subroutines 236 to jump to the first address 216 or back to themselves. As a result, where a stuck-at high causes the processing core 202 to retrieve one of the first trap sub-portions 224 and execute one of the first trap subroutines 236 instead of retrieving the first sub-portion 212 and executing the first subroutine 232, one of the first trap sub-portions 224 may be repeatedly retrieved and the corresponding one of the first trap subroutines 236 may be repeatedly executed. Accordingly, responsive to a single stuck-at high fault of the program counter 208 or the address bus 246, the processing core 202 will get stuck in a continuous loop of executing one of the first trap subroutines 236.

In some examples the first sub-portion 212 instructs the processing core 202 to execute the first subroutine 232 to jump to the second address 220. As a result, in the case of the first address 216 being a consecutive series of zeros, if no stuck-at high faults are present at the program counter 208 the current address 210 of the program counter 208 may be updated to the second address 220 (e.g., a consecutive series of ones: 0xFFFF, the bootend address, or the end of memory address). The second address 220 may be a ones' complement of the first address 216 to enable detection of all stuck-at faults by execution of the first subroutine 232 and the second subroutine 234. In other words, the first subroutine 232 and first trap subroutines 236 enable detection of stuck-at high faults, and the second subroutine 234 and second trap subroutines 238 enable detection of stuck-at low faults.

The second trap addresses 230 are different from the second address 220 by only a single bit. For example, where the second address 220 is 0xFFFF (hexadecimal, which is equal to 16 consecutive ones in binary), the second trap sub-portions 226 may be at addresses 230 0x7FFF, 0xBFFF, 0xDFFF, 0xEFFF, 0xF7FF, 0xFBFF, 0xFDFF, 0xFEFF, 0xFF7F, 0xFFBF, 0xFFDF, 0xFFEF, 0xFFF7, 0xFFFB, 0xFFFD, and 0xFFFE. The second trap sub-portions 226 instruct the processing core 202 to execute second trap subroutines 238 to jump to the second address 220, back to themselves, or to the first address 216. As a result, where a stuck-at low causes the processing core 202 to retrieve one of the second trap sub-portions 226 and execute one of the second trap subroutines 238 instead of retrieving the second sub-portion 218 and executing the second subroutine 234, one of the second trap sub-portions 226 may be repeatedly retrieved and the corresponding one of the second trap subroutines 238 may be repeatedly executed. Accordingly, responsive to a single stuck-at low fault of the program counter 208 or the address bus 246, the processing core 202 will get stuck in a continuous loop of executing one of the second trap subroutines 238.

In order to trap all possible one-bit stuck at faults, numbers, i.e., quantity, of the first trap sub-portions 224 and the second trap sub-portions 226 are each equal to a number of bits of the addresses, i.e., for addresses with X bits, there are X first trap sub-portions 224 and X second trap sub-portions 226.

In some examples the processing circuit 200 includes a watchdog timer 260 to detect stuck-at faults of the program counter 208 during run-time. The watchdog timer 260 initiates a reset operation responsive to detecting a fault, such as a stuck-at fault of the program counter 208, e.g., since the watchdog timer 260 is not reset prior to timing out. Following the reset operation the processing core 202 will get stuck in a continuous loop of executing one of the first trap subroutines 236 or the second trap subroutines 238 as discussed above. In some examples the watchdog timer 260 may be implemented independently from the computer-readable instructions 206 to prevent stuck-at faults from interfering with operation of the watchdog timer 260. In some examples a watchdog timer external (not shown) to the processing circuit 200 may be used. In some examples the watchdog timer 260 initiates the reset operation independently from the processing core 202.

Figure 3:
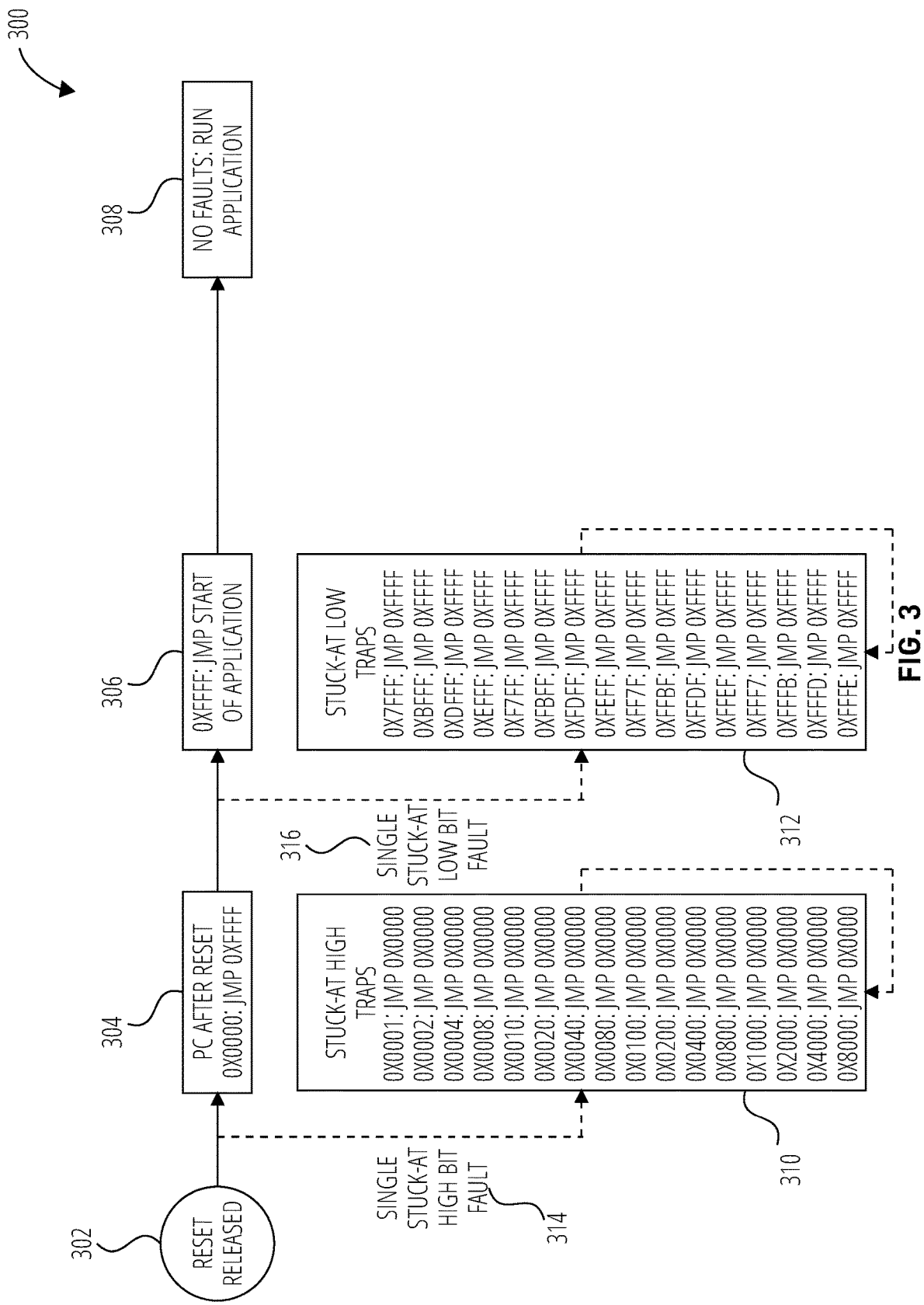
FIG. 3 is an operational flow diagram illustrating an example of a method of operating the processing circuit of FIG. 2, according to some examples.

FIG. 3 is an operational flow diagram illustrating an example of a method 300 of operating the processing circuit 200 of FIG. 2, according to some examples. FIG. 3 is shown with a 16-bit program counter 208 (FIG. 2). The implementation covers all single bit stuck-at faults out of a reset. The implementation assumes that the first instruction executed is at address 0x0000. It should be noted that a different number of bits program counter may instead be implemented and that a 16-bit program counter 208 is merely discussed herein as an example. For example, the implementation may be adapted to work with other size program counters (e.g., 8-bit, 32-bit, 64-bit program counters), i.e., other than 16-bit program counters. The implementation may be adapted to work with start addresses other than 0x0000

Normal operation (e.g., operation without a single stuck-at high bit fault 314 or a single stuck-at low bit fault 316) of the processing circuit 200 (FIG. 2) is indicated in FIG. 3 using arrows having solid lines, and abnormal operation of the processing circuit 200 is indicated using arrows with broken lines. At operation 302 the method 300 includes release of a reset. Under normal operation (no stuck-at faults such as a single stuck-at high bit fault 314 or single stuck-at low bit fault 316) the program counter 208 after the reset is released may be set to 0x0000 and execute a jump to the end of memory address 0xFFFF (e.g., JMP 0xFFFF) at operation 304. Responsive to the jump to the end of memory address execution at operation 304, i.e., to memory address 0xFFFF, the method 300 includes executing a jump to a start of application at operation 306 (e.g., JMP start of application from memory address 0xFFFF). At operation 308, if no faults are detected, the method 300 includes running an application.

If, however, the program counter 208 or the address bus 246 (FIG. 2) experiences a single stuck-at high bit fault 314, one of several stuck-at high traps 310 may be executed instead of a reset vector (address 0x0000). First trap addresses 228 (FIG. 2) associated with these stuck-at high traps 310 may be one bit different from the initial reset address 0x0000 such as 0x0001, 0x0002, 0x0004, 0x0008, 0x0010, 0x0020, 0x0040, 0x0080, 0x0100, 0x0200, 0x0400, 0x0800, 0x1000, 0x2000, 0x4000, and 0x8000. In the example illustrated in FIG. 3 each of the stuck-at high traps 310 executes a jump to 0x0000 (reset vector address). Because of the single stuck-at high bit fault 314, however, the same one of the stuck-at high traps 310 will be executed, trapping the method 300 into repeated execution of the one of the stuck-at high traps 310. Accordingly, the processing circuit 200 (FIG. 2) proceeds in safe operation, i.e., without jumping to an unknown address.

If the program counter 208 or the address bus 246 experiences a single stuck-at low bit fault 316, the reset vector (0x0000) is executed correctly. However, one of several stuck-at low traps 312 may be executed instead of 0xFFFF (end of program memory) at operation 306. Second trap addresses 230 (FIG. 2) associated with these stuck-at low traps 312 may be one bit different from 0xFFFF such as 0x7FFF, 0xBFFF, 0xDFFF, OXEFFF, 0xF7FF, 0xFBFF, 0xFDFF, 0xFEFF, 0xFF7F, 0xFFBF, 0xFFDF, 0xFFEF, 0xFFF7, 0xFFFB, 0xFFFD, and 0xFFFE. In the example illustrated in FIG. 3 each of the stuck-at low traps 312 may execute to jump to 0xFFFF. Because of the single stuck-at low bit fault 316, however, the same one of the stuck-at low traps 312 will be executed, trapping the method 300 into repeated execution of the one of the stuck-at low traps 312. Accordingly, the processing circuit 200 (FIG. 2) proceeds in safe operation, i.e., without jumping to an unknown address.

Examples of the disclosure catch all single-bit program counter stuck-at faults safely. As previously discussed, examples disclosed herein may be used in combination with a watchdog timer that implements an independent timeslot monitoring mechanism so that stuck-at faults that emerge at run-time are detected by the watchdog timer (regardless of code mis-execution caused by program counter stuck-at faults), which may then be monitored by another system to identify the repeated execution of one of the stuck-at high traps 310 or one the stuck-at low traps 312. The watchdog timer generates a RESET independently of the CPU, and will, by doing so, set the stage for the program counter stuck-at trapper to keep the system in a safe state after a reset. Once the stuck-at trapper is triggered by the fault the system remains safe, even if the watchdog timer cannot be initialize by software.

As an alternative to jumping to stuck-at high traps 310 jumping to address 0x0000 a stuck-at high trap 310 may jump to itself. Similarly, instead of jumping to 0xFFFF a stuck-at low trap 312 may jump to itself. An example of this alternative will be described in relation to FIG. 4.

Figure 4:
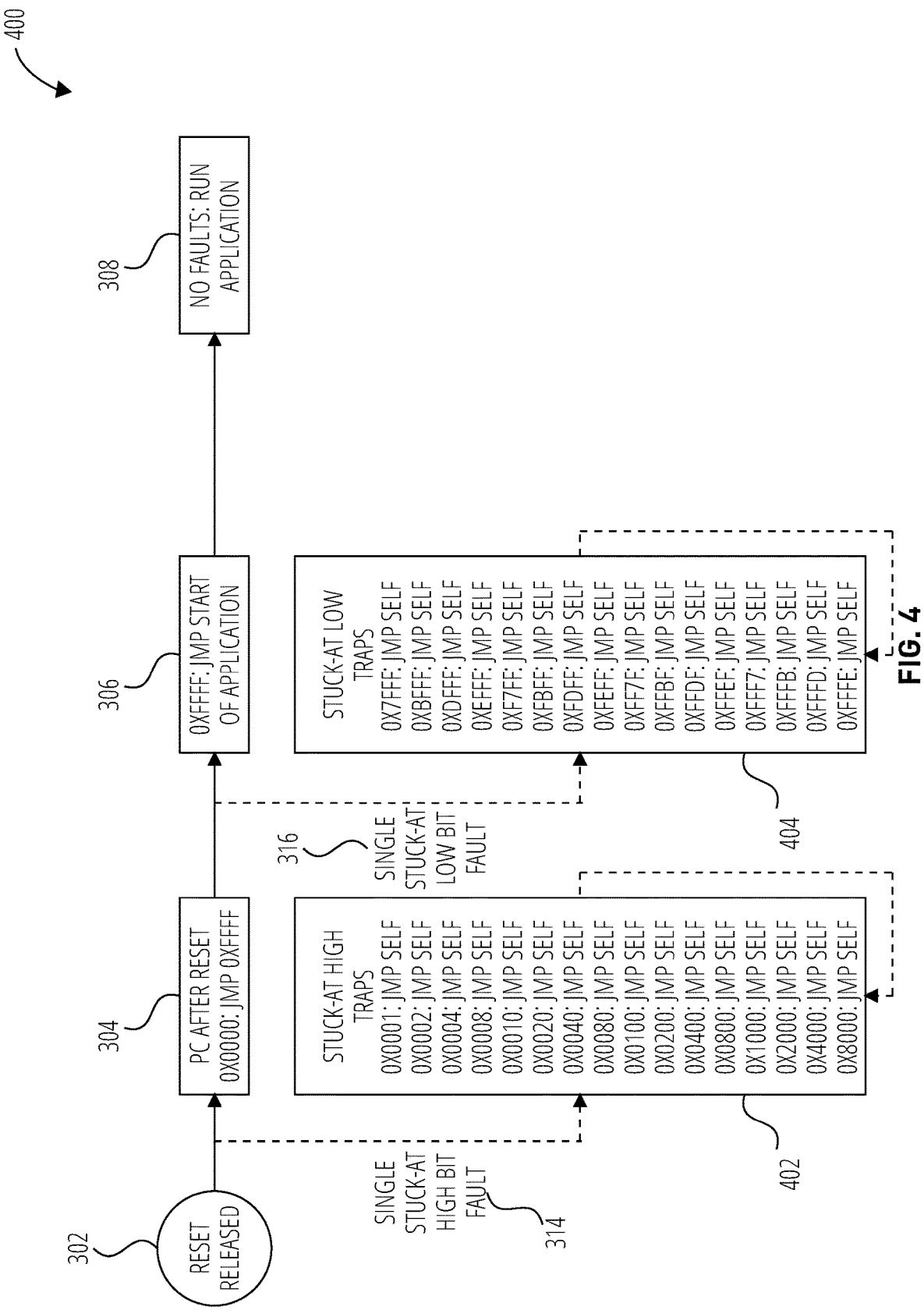
FIG. 4 is an operational flow diagram illustrating another example of a method of operating the processing circuit of FIG. 2, according to some examples.

FIG. 4 is an operational flow diagram illustrating another example of a method 400 of operating the processing circuit 200 of FIG. 2, according to some examples. The method 400 is similar to the method 300 of FIG. 3. For example, the method 400 includes the operations 302, 304, 306, and 308 discussed above with reference to FIG. 3. In contrast to the stuck-at high traps 310 of FIG. 3, which execute to jump to 0x0000, the method 400 includes stuck-at high traps 402, which execute to jump to themselves (JMP SELF). Also, in contrast to the stuck-at low traps 312 of FIG. 3, which execute to jump to 0xFFFF, the method 400 includes stuck-at low traps 404, which execute to jump to themselves (JMP SELF).

If the program counter 208 experiences the single stuck-at high bit fault 314, one of several stuck-at high traps 402 may be executed instead of the reset vector (address 0x0000). In the example illustrated in FIG. 4 each of the stuck-at high traps 402 may execute to jump to itself, which will in turn execute to jump to the same one of the stuck-at high traps 402, i.e., to itself. Jumps back to itself will be continually repeated, trapping the method 400 into repeated execution of one of the stuck-at high traps 402. Accordingly, the processing circuit 200 (FIG. 2) proceeds in safe operation, i.e., without jumping to an unknown address.

If the program counter 208 experiences a single stuck-at low bit fault 316, the reset vector (0x0000) is executed correctly. However, one of several stuck-at low traps 404 may be executed instead of 0xFFFF. In the example illustrated in FIG. 4 each of the stuck-at low traps 404 may execute to jump to itself, which will in turn execute to again jump to itself (i.e., the same one of the stuck-at low traps 404). Jumps back to the same one of the stuck-at low traps 404 will be continually repeated, trapping the method 400 into repeated execution of one of the stuck-at low traps 404. Accordingly, the processing circuit 200 (FIG. 2) proceeds in safe operation, i.e., without jumping to an unknown address.

Figure 5:
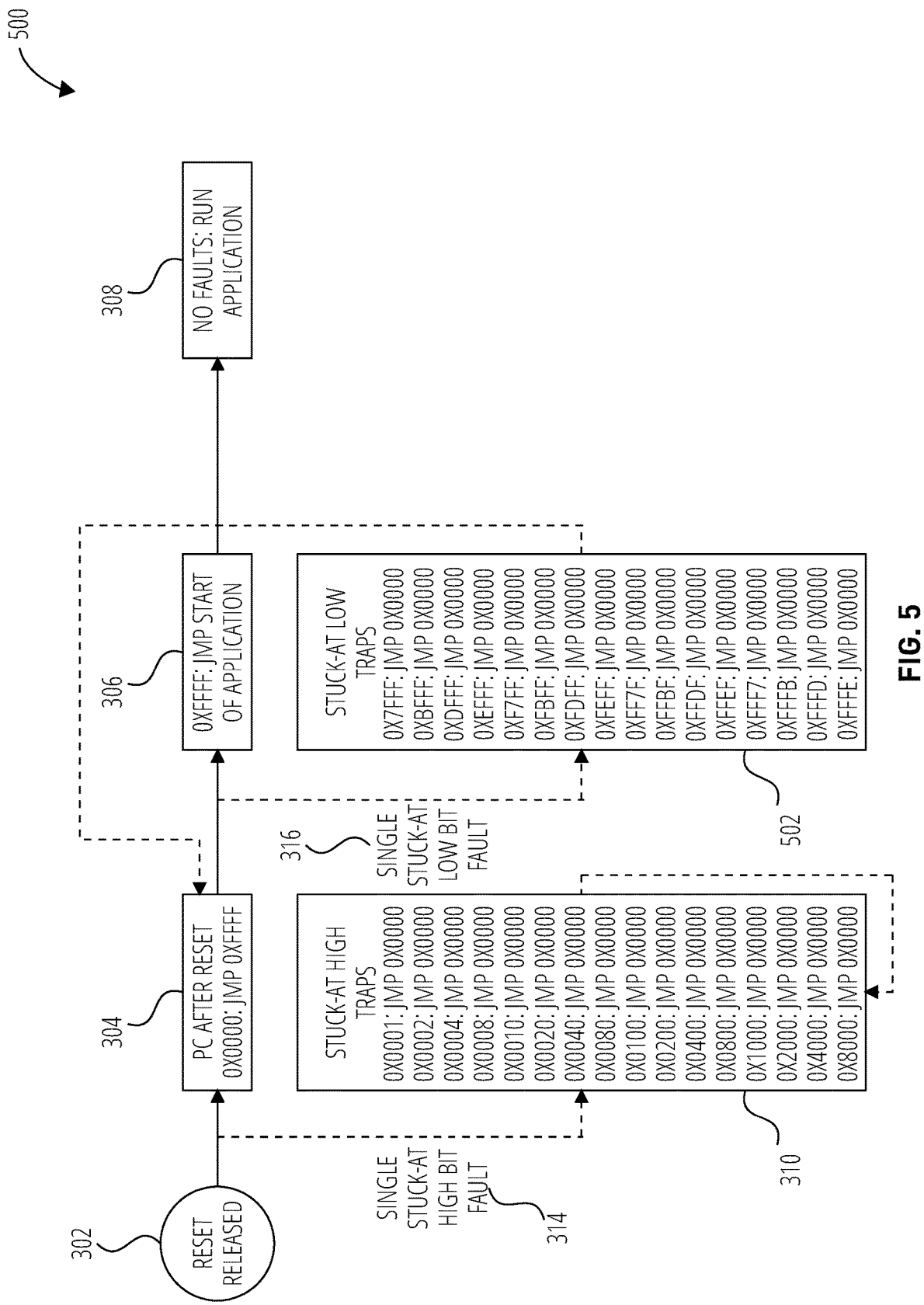
FIG. 5 is an operational flow diagram illustrating yet another example of a method of operating the processing circuit of FIG. 2, according to some examples.

FIG. 5 is an operational flow diagram illustrating yet another example of a method 500 of operating the processing circuit 200 of FIG. 2, according to some examples. The method 500 is similar to the method 300 of FIG. 3. For example, the method 500 includes the operations 302, 304, 306, and 308 discussed above with reference to FIG. 3. The method 500 also includes the stuck-at high traps 310 discussed above with reference to FIG. 3. In contrast, however, to the stuck-at low traps 312 of FIG. 3, which execute to jump to 0xFFFF, the method 500 includes stuck-at low traps 502, which execute to jump to the initial reset vector 0x0000 (JMP 0x0000).

Responsive to the single stuck-at high bit fault 314 the method 500 may operate similarly to the method 300 of FIG. 3 because the method 500 includes the stuck-at high traps 310 of FIG. 3. Also, responsive to the single stuck-at low bit fault 316, the reset vector (0x0000) is executed correctly. However, one of several stuck-at low traps 502 may be executed instead of operation 306 at 0xFFFF. In the example illustrated in FIG. 5 each of the stuck-at low traps 502 may execute to jump to the reset vector 0x0000. Absent a single stuck-at high bit fault 314, operation 304 may correctly execute to jump to 0xFFFF, but responsive to the single stuck-at low bit fault 316 the same one of the stuck-at low traps 502 that previously executed the jump back to the reset vector 0x0000 may again execute to again jump back to the reset vector 0x0000. Jumps back to the reset vector, execution of operation 304, and the single stuck-at low bit fault 316 may continuously repeat, trapping the method 500 into repeated execution of one of the stuck-at low traps 502. Accordingly, the processing circuit 200 (FIG. 2) proceeds in safe operation i.e., without jumping to an unknown address.

Figure 6:
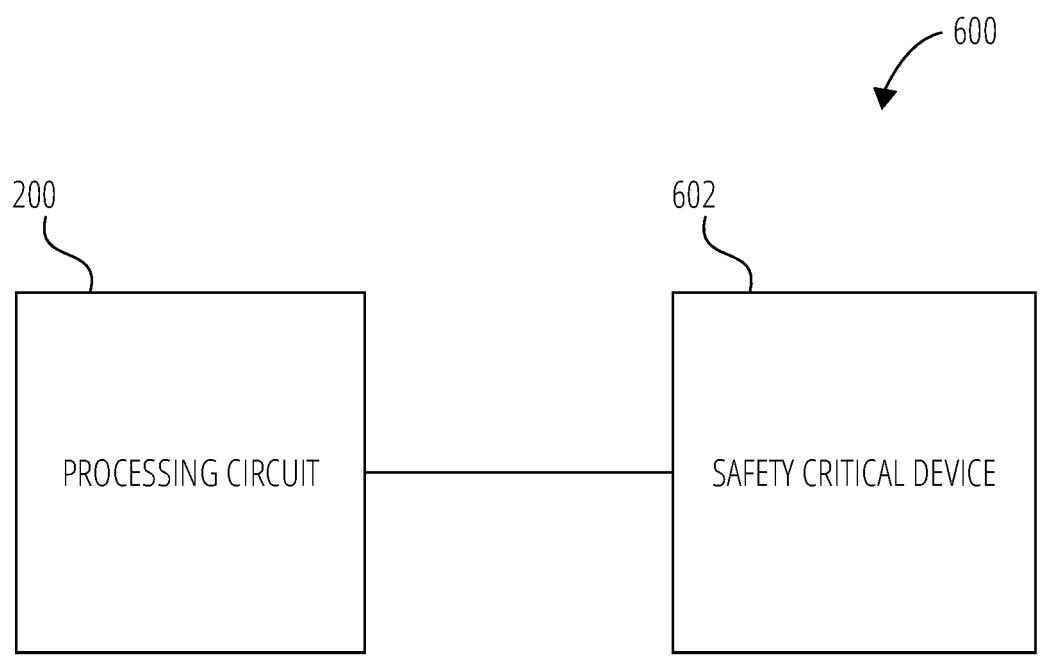
FIG. 6 is a block diagram of a safety critical system including the processing circuit of FIG. 3, according to some examples.

FIG. 6 is a block diagram of a safety critical system 600 including the processing circuit 200 of FIG. 2, according to some examples. The safety critical system 600 also includes a safety critical device 602 controlled by the processing circuit 200.

By way of non-limiting example, the safety critical device 602 may include a valve to allow and restrict flow of a flammable fluid. Also by way of non-limiting example, the safety critical device 602 may include a medical device (e.g., a pacemaker, ventilator, dialysis device, life support device, etc.) an electrical infrastructure device (e.g., a fuse, a circuit breaker, an alarm, etc.), a nuclear power system, a vehicle brake, other safety-critical devices, or combinations thereof.

As the processing circuit 200 traps operation of the processing circuit 200 into a continuous loop responsive to single-bit stuck-at faults in the program counter 208 or address bus 246 (FIG. 2), the processing circuit 200 may not cycle through random application subroutines 244 (FIG. 2), which may prevent unsafe operation of the safety critical device 602.

Figure 7:
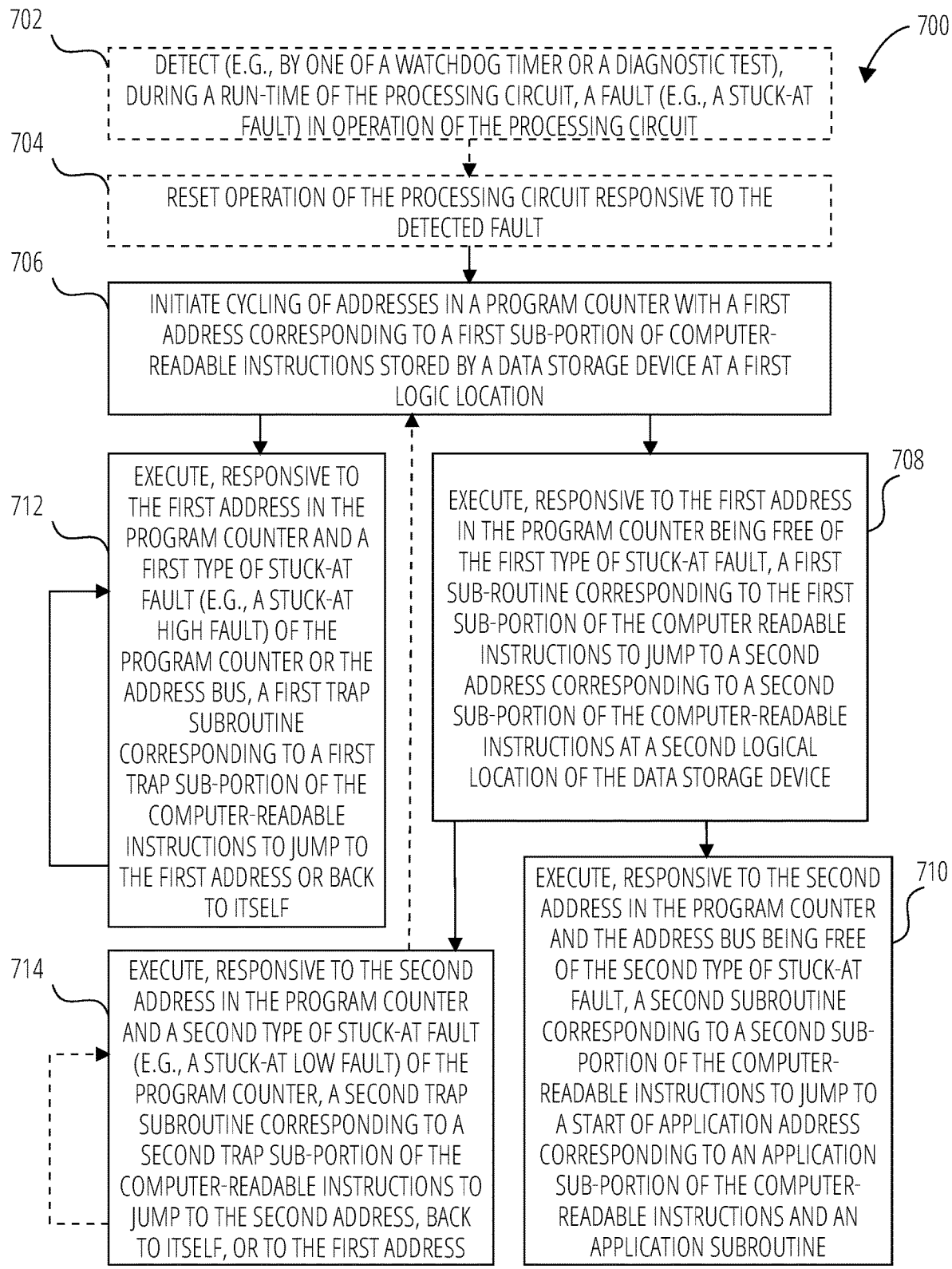
FIG. 7 is a flowchart illustrating a method of operating a processing circuit, according to some examples.

FIG. 7 is a flowchart illustrating a method 700 of operating a processing circuit (e.g., the processing circuit 200 of FIG. 2), according to some examples. At operation 702 the method 700 includes detecting, during a run-time of the processing circuit, a fault in operation of the processing circuit. By way of non-limiting example, detecting the fault may include detecting, by one of a watchdog timer (e.g., the watchdog timer 260 of FIG. 2) or a diagnostic test, a stuck-at fault. At operation 704 the method 700 includes resetting operation of the processing circuit responsive to the detected fault.

At operation 706 the method 700 includes initiating cycling of addresses in a program counter (e.g., the program counter 208 of FIG. 2, without limitation) with a first address (e.g., the first address 216 of FIG. 2, without limitation) corresponding to a first sub-portion (e.g., the first sub-portion 212 of FIG. 2, without limitation) of computer-readable instructions (e.g., the computer-readable instructions 206 of FIG. 2, without limitation) stored by a data storage device (e.g., the data storage device 204 of FIG. 2, without limitation) at a first location (e.g., at the first location 214 of FIG. 2, without limitation). At operation 712 the method 700 includes executing, responsive to the first address in the program counter and a first type of stuck-at fault (e.g., a stuck-at high fault) of the program counter or the address bus, a first trap subroutine corresponding to a first trap sub-portion of the computer-readable instructions to jump to the first address or back to itself.

At operation 708 the method 700 includes executing, responsive to the first address in the program counter and address bus being free of the first type of stuck-at fault, a first sub-routine corresponding to the first sub-portion of the computer readable instructions to jump to a second address corresponding to a second sub-portion of the computer-readable instructions at a second location of the data storage device. At operation 714 the method 700 includes executing, responsive to the second address in the program counter and a second type of stuck-at fault (e.g., a stuck-at low fault) of the program counter or the address bus, a second trap subroutine corresponding to a second trap sub-portion of the computer-readable instructions to jump to the second address, back to itself, or to the first address. Arrows including broken lines are drawn from operation 714 to operation 706 and operation 714 to indicate that either operation 706 or operation 714 may be executed responsive to operation 714.

At operation 710 the method 700 includes executing, responsive to the second address in the program counter and the address bus being free of the second type of stuck-at fault, a second subroutine corresponding to a second sub-portion of the computer-readable instructions to jump to a start of application address corresponding to an application sub-portion of the computer-readable instructions and an application subroutine.

Operations 702 and 704 are indicated using broken lines to indicate that these operations may only be executed if the stuck-at fault occurs during a run-time of the processing circuit. If the stuck-at fault occurs outside of the run-time of the processing circuit the method 700 may begin at operation 706.

Figure 8:
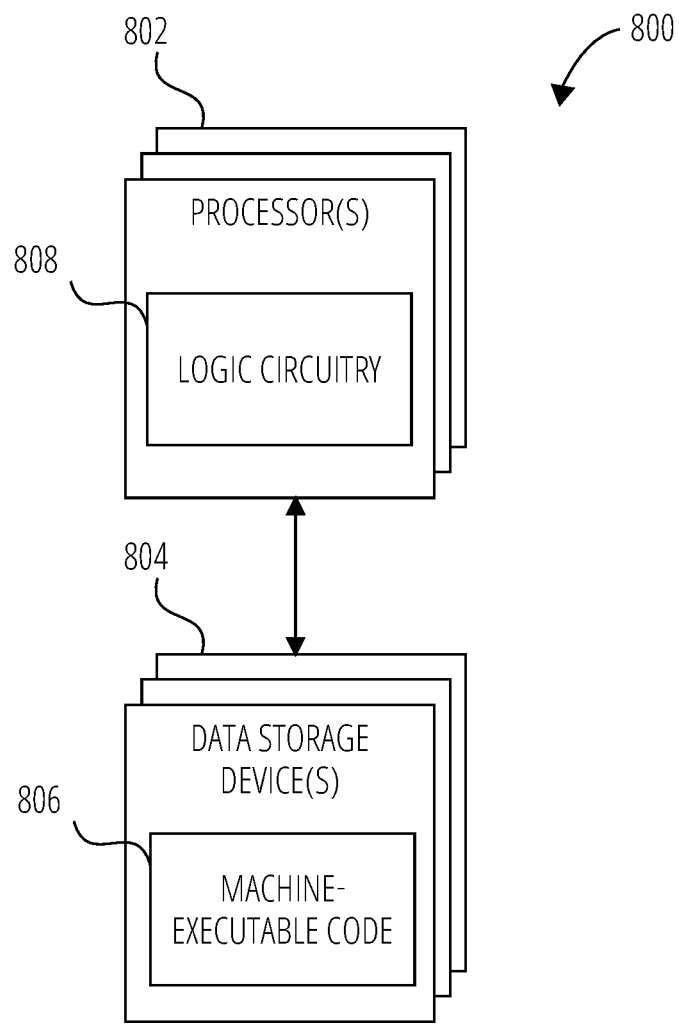
FIG. 8 is a block diagram of circuitry that, in some examples, may be used to implement various functions, operations, acts, processes, and/or methods disclosed herein.

It will be appreciated by those of ordinary skill in the art that functional elements of examples disclosed herein (e.g., functions, operations, acts, processes, and/or methods) may be implemented in any suitable hardware, software, firmware, or combinations thereof. FIG. 8 illustrates non-limiting examples of implementations of functional elements disclosed herein. In some examples, some or all portions of the functional elements disclosed herein may be performed by hardware specially designed for carrying out the functional elements.

FIG. 8 is a block diagram of circuitry 800 that, in some examples, may be used to implement various functions, operations, acts, processes, and/or methods disclosed herein. The circuitry 800 includes one or more processors 802 (sometimes referred to herein as "processors 802") operably coupled to one or more data storage devices (sometimes referred to herein as "storage 8004"). The storage 804 includes machine-executable code 806 stored thereon and the processors 802 include logic circuitry 808. The machine-executable code 806 includes information describing functional elements that may be implemented by (e.g., performed by) the logic circuitry 808. The logic circuitry 808 is adapted to implement (e.g., perform) the functional elements described by the machine-executable code 806. The circuitry 800, when executing the functional elements described by the machine-executable code 806, should be considered as special purpose hardware for carrying out functional elements disclosed herein. In some examples the processors 802 may perform the functional elements described by the machine-executable code 806 sequentially, concurrently (e.g., on one or more different hardware platforms), or in one or more parallel process streams.

When implemented by logic circuitry 808 of the processors 802, the machine-executable code 806 adapts the processors 802 to perform operations of examples disclosed herein. For example, the machine-executable code 806 may adapt the processors 802 to perform at least a portion or a totality of the method 300 of FIG. 3, the method 400 of FIG. 4, the method 500 of FIG. 5, and/or the method 700 of FIG. 7. As another example, the machine-executable code 806 may adapt the processors 802 to perform at least a portion or a totality of the operations discussed for the processing circuit 200 of FIG. 2.

The processors 802 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes functional elements corresponding to the machine-executable code 806 (e.g., software code, firmware code, hardware descriptions) related to examples of the present disclosure. It is noted that a general-purpose processor (may also be referred to herein as a host processor or simply a host) may be a microprocessor, but in the alternative, the processors 802 may include any conventional processor, controller, microcontroller, or state machine. The processors 802 may also be implemented as a combination of computing devices, such as a combination of a DSP and a microprocessor, a plurality of microprocessors, one or more microprocessors in conjunction with a DSP core, or any other such configuration.

In some examples the storage 804 includes volatile data storage (e.g., random-access memory (RAM)), non-volatile data storage (e.g., Flash memory, a hard disc drive, a solid state drive, erasable programmable read-only memory (EPROM), etc.). In some examples the processors 802 and the storage 804 may be implemented into a single device (e.g., a semiconductor device product, a system on chip (SOC), etc.). In some examples the processors 802 and the storage 804 may be implemented into separate devices.

In some examples the machine-executable code 806 may include computer-readable instructions (e.g., software code, firmware code). By way of non-limiting example, the computer-readable instructions may be stored by the storage 804, accessed directly by the processors 802, and executed by the processors 802 using at least the logic circuitry 808. Also by way of non-limiting example, the computer-readable instructions may be stored on the storage 804, transferred to a memory device (not shown) for execution, and executed by the processors 802 using at least the logic circuitry 808. Accordingly, in some examples the logic circuitry 808 includes electrically configurable logic circuitry 808.

In some examples the machine-executable code 806 may describe hardware (e.g., circuitry) to be implemented in the logic circuitry 808 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, System-Verilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 808 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples the machine-executable code 806 may include an HDL, an RTL, a GL description, a mask level description, other hardware description, or any combination thereof.

In examples where the machine-executable code 806 includes a hardware description (at any level of abstraction), a system (not shown, but including the storage 804) may implement the hardware description described by the machine-executable code 806. By way of non-limiting example, the processors 802 may include a programmable logic device (e.g., an FPGA or a PLC) and the logic circuitry 808 may be electrically controlled to implement circuitry corresponding to the hardware description into the logic circuitry 808. Also by way of non-limiting example, the logic circuitry 808 may include hard-wired logic manufactured by a manufacturing system (not shown, but including the storage 804) according to the hardware description of the machine-executable code 806.

Regardless of whether the machine-executable code 806 includes computer-readable instructions or a hardware description, the logic circuitry 808 is adapted to perform the functional elements described by the machine-executable code 806 when implementing the functional elements of the machine-executable code 806. It is noted that although a hardware description may not directly describe functional elements, a hardware description indirectly describes functional elements that the hardware elements described by the hardware description are capable of performing.

EXAMPLES

A non-exhaustive, non-limiting list of examples follows. Not each of the examples listed below is explicitly and individually indicated as being combinable with all others of the examples listed below and examples discussed above. It is intended, however, that these examples are combinable with all other examples unless it would be apparent to one of ordinary skill in the art that the examples are not combinable.

Example 1: An apparatus, comprising: a processing core including a program counter to cycle through addresses; and a data storage device including computer-readable instructions stored thereon, the computer-readable instructions including sub-portions of the computer-readable instructions to instruct the processing core to execute subroutines, each sub-portion of the computer-readable instructions corresponding to one of the subroutines, locations of the sub-portions of the computer-readable instructions within the data storage device associated with the addresses, the sub-portions including: a first sub-portion at a first location within the data storage device indicated by a first address; and first trap sub-portions at first trap locations within the data storage device, the first trap sub-portions indicated by respective first trap addresses, the first trap addresses different from the first address by only a single bit, the first trap sub-portions to instruct the processing core to execute respective first trap subroutines to jump to one of the first address or to themselves.

Example 2: The apparatus of Example 1, wherein the first address is a consecutive series of zeros.

Example 3. The apparatus according to any one of Examples 1 and 2, wherein the first address comprises a plurality of bits, each of the first trap addresses differing from the first address by a single respective bit.

Example 4: The apparatus according to any one of Examples 1-3, wherein the sub-portions include: a second sub-portion at a second location within the data storage device indicated by a second address, the second address a ones' complement of the first address, the first sub-portion to instruct the processing core to execute a first subroutine to jump to the second address; and second trap sub-portions at second trap locations within the data storage device, the second trap locations indicated by second trap addresses, the second trap addresses different from the second address by only a single bit, the second trap sub-portions to instruct the processing core to execute second trap subroutines to jump to the second address or to themselves.

Example 5: The apparatus of Example 4, wherein one of the first address and the second address is a consecutive series of zeros and the other of the first address and the second address is a consecutive series of ones.

Example 6: The apparatus according to any one of Examples 1-5, wherein the sub-portions include: a second sub-portion at a second location within the data storage device indicated by a second address, the second address a ones' complement of the first address, the first sub-portion to instruct the processing core to execute a first subroutine to jump to the second address; and second trap sub-portions at second trap locations within the data storage device, the second trap locations indicated by second trap addresses, the second trap addresses different from the second address by only a single bit, the second trap sub-portions to instruct the processing core to execute second trap subroutines to jump to the second address, to themselves, or to the first address.

Example 7: The apparatus of Example 6, comprising an address bus electrically connecting the program counter to the data storage device, wherein the second trap sub-portions prevent a jump to an unknown address in the event of a single stuck-at low bit fault at one or more of the address bus or the program counter.

Example 8: The apparatus according to any one of Examples 1-7, comprising a watchdog timer to detect a fault of the program counter or of an address bus electrically connecting the program counter to the data storage device during run-time, the watchdog timer to initiate a reset operation responsive to detecting the fault of the program counter during run-time.

Example 9: The apparatus of Example 8, wherein the watchdog timer is implemented independently from the subroutines.

Example 10: The apparatus according to any one of Examples 8 and 9, the watchdog timer to initiate the reset operation independently from the processing core.

Example 11: The apparatus according to any one of Examples 8-10, wherein the watchdog timer is implemented in hardware separate from the processing core.

Example 12: The apparatus according to any one of Examples 1-11, comprising an address bus electrically connecting the program counter to the data storage device, wherein the first trap sub-portions prevent a jump to an unknown address in the event of a single stuck-at high bit fault at one or more of the address bus or the program counter.

Example 13: A system, comprising: a safety critical device; and a processing circuit to control the safety critical device, the processing circuit comprising: a processing core including a program counter to cycle through addresses; a data storage device including computer-readable instructions stored thereon, the computer-readable instructions including sub-portions of the computer-readable instructions, the sub-portions to instruct the processing core to execute subroutines, the sub-portions including: a first sub-portion at a first location within the data storage device indicated by a first address of the addresses; first trap sub-portions at first trap locations within the data storage device, the first trap locations indicated by respective first trap addresses of the addresses, the first trap addresses different from the first address by only a single respective bit, the first trap sub-portions to instruct the processing core to execute first trap subroutines to jump to the first address or back to themselves; a second sub-portion at a second location within the data storage device indicated by a second address of the addresses, the second address a ones' complement of the first address, the first sub-portion to instruct the processing core to execute a first subroutine to jump to the second address; and second trap sub-portions at second trap locations within the data storage device, the second trap locations indicated by respective second trap addresses of the addresses, the second trap addresses different from the second address by only a single respective bit, the second trap sub-portions to instruct the processing core to execute second trap subroutines to jump to the second address, to themselves, or to the first address.

Example 14: The system of Example 13, wherein numbers of the first trap sub-portions and the second trap sub-portions are each equal to a number of bits of the addresses.

Example 15: A method of operating a processing circuit, the method comprising: initiating cycling of addresses in a program counter with a first address corresponding to a first sub-portion of computer-readable instructions stored by a data storage device at a first location; executing, responsive to the first address in the program counter and a first type of stuck-at fault of the program counter or of an address bus, a first trap subroutine corresponding to a first trap sub-portion of the computer-readable instructions to jump to the first address or to itself; executing, responsive to the first address in the program counter and the address bus being free of the first type of stuck-at fault, a first sub-routine corresponding to the first sub-portion of the computer readable instructions to jump to a second address corresponding to a second sub-portion of the computer-readable instructions at a second location of the data storage device; and executing, responsive to the second address in the program counter and a second type of stuck-at fault of the program counter or of the address bus, a second trap subroutine corresponding to a second trap sub-portion of the computer-readable instructions to jump to the second address, to the first address, or to itself.

Example 16: The method of Example 15, comprising executing, responsive to the second address in the program counter or of the address bus being free of the second type of stuck-at fault, a second subroutine corresponding to a second sub-portion of the computer-readable instructions to jump to a start of application address corresponding to an application sub-portion of the computer-readable instructions and an application subroutine.

Example 17: The method according to any one of Examples 15 and 16, comprising: detecting, during a run-time of the processing circuit, a fault in operation of the processing circuit; and resetting operation of the processing circuit responsive to the detected fault.

Example 18: The method of Example 17, wherein detecting the fault comprises detecting a stuck-at fault of the program counter or of the address bus by one of a watchdog timer and a diagnostic test.

Example 19: The method according to any one of Examples 15-18, wherein the first type of stuck-at fault is a stuck-at high fault and the second type of stuck-at fault is a stuck-at low fault.

Example 20: The method according to any one of Examples 15-19, wherein initiating the cycling of the addresses in the program counter with the first address comprises initiating the cycling of the addresses in the program counter with the first address including a consecutive series of all zeros.

Example 21: A processing circuit, comprising: a processing core including a program counter configured to cycle through addresses; and a data storage device including computer-readable instructions stored thereon, the computer-readable instructions including sub-portions of the computer-readable instructions, the sub-portions of the computer-readable instructions configured to instruct the processing core to execute subroutines, each sub-portion of the computer-readable instructions corresponding to one of the subroutines, locations of the sub-portions of the computer-readable instructions within the data storage device associated with the addresses, the sub-portions including: a first sub-portion at a first location within the data storage device indicated by a first address; and first trap sub-portions at first trap locations within the data storage device, the first trap locations indicated by first trap addresses, the first trap addresses different from the first address by only a single bit, the first trap sub-portions configured to instruct the processing core to execute first trap subroutines to jump to the first address or to one of the first trap addresses.

Example 22: The processing circuit of Example 21, wherein the first address is a consecutive series of zeros.

Example 23: The processing circuit according to any one of Examples 21 and 22, wherein the sub-portions further include: a second sub-portion at a second location within the data storage device indicated by a second address, the second address a ones' complement of the first address, the first sub-portion configured to instruct the processing core to execute a first subroutine to jump to the second address; and second trap sub-portions at second trap locations within the data storage device, the second trap locations indicated by second trap addresses, the second trap addresses different from the second address by only a single bit, the second trap sub-portions configured to instruct the processing core to execute second trap subroutines to jump to the second address or back to the second trap addresses.

Example 24: The processing circuit of Example 23, wherein one of the first address and the second address is a consecutive series of zeros and the other of the first address and the second address is a consecutive series of ones.

Example 25: The processing circuit according to any one of Examples 21-24, further comprising a watchdog timer configured to detect stuck-at faults of the program counter during run-time, the watchdog timer configured to initiate a reset operation responsive to detecting a stuck-at fault.

Example 26: The processing circuit of Example 25, wherein the watchdog timer is implemented independently from the subroutines to prevent the stuck-at faults from interfering with operation of the watchdog timer.

Example 27: The processing circuit according to any one of Examples 25 and 26, wherein the watchdog timer is configured to initiate and initiate the reset operation independently from the processing core.

Example 28: The processing circuit according to any one of Examples 25-27, wherein the watchdog timer is implemented in hardware separate from the processing core.

Example 29: A safety critical system, comprising: a safety critical device; and a processing circuit configured to control the safety critical device, the processing circuit comprising: a processing core including a program counter configured to cycle through addresses; a data storage device including computer-readable instructions stored thereon, the computer-readable instructions including sub-portions of the computer-readable instructions, the sub-portions configured to instruct the processing core to execute subroutines, the sub-portions including: a first sub-portion at a first location within the data storage device indicated by a first address of the addresses; first trap sub-portions at first trap locations within the data storage device, the first trap locations indicated by first trap addresses of the addresses, the first trap addresses different from the first address by only a single bit, the first trap sub-portions configured to instruct the processing core to execute first trap subroutines to jump to the first address or back to the first trap addresses; a second sub-portion at a second location within the data storage device indicated by a second address of the addresses, the second address a ones' complement of the first address, the first sub-portion configured to instruct the processing core to execute a first subroutine to jump to the second address; and second trap sub-portions at second trap locations within the data storage device, the second trap locations indicated by second trap addresses of the addresses, the second trap addresses different from the second address by only a single bit, the second trap sub-portions configured to instruct the processing core to execute second trap subroutines to jump to the second address or back to the second trap addresses.

Example 30: The safety critical system of Example 29, wherein numbers of the first trap sub-portions and the second trap sub-portions are each equal to a number of bits of the addresses.

Example 31: A method of operating a processing circuit, the method comprising: initiating cycling of addresses in a program counter with a first address corresponding to a first sub-portion of computer-readable instructions stored by a data storage device at a first location; executing, responsive to the first address in the program counter and a first type of stuck-at fault of the program counter, a first trap subroutine corresponding to a first trap sub-portion of the computer-readable instructions to jump to the first address; executing, responsive to the first address in the program counter being free of the first type of stuck-at fault, a first sub-routine corresponding to the first sub-portion of the computer readable instructions to jump to a second address corresponding to a second sub-portion of the computer-readable instructions at a second location of the data storage device; and executing, responsive to the second address in the program counter and a second type of stuck-at fault of the program counter, a second trap subroutine corresponding to a second trap sub-portion of the computer-readable instructions to jump to the second address.

Example 32: The method of Example 31, further comprising executing, responsive to the second address in the program counter being free of the second type of stuck-at fault, a second subroutine corresponding to a second sub-portion of the computer-readable instructions to jump to a bootend address corresponding to a bootend sub-portion of the computer-readable instructions and a bootend subroutine.

Example 33: The method according to any one of Examples 31 and 32, further comprising: detecting, during a run-time of the processing circuit, a fault in operation of the processing circuit; and resetting operation of the processing circuit responsive to the detected fault.

Example 34: The method of Example 33, wherein detecting the fault comprises detecting a stuck-at fault of the program counter by one of a watchdog timer and a diagnostic test.

Example 35: The method according to any one of Examples 31-34, wherein the first type of stuck-at fault is a stuck-at low fault and the second type of stuck-at fault is a stuck-at high fault.

Example 36: The method according to any one of Examples 31-35, wherein initiating the cycling of the addresses in the program counter with the first address comprises initiating the cycling of the addresses in the program counter with the first address including a consecutive series of all zeros.

CONCLUSION

As used in the present disclosure, the terms "module" or "component" may refer to specific hardware implementations that perform the actions of the module or component and/or software objects or software routines that may be stored on and/or executed by general purpose hardware (e.g., computer-readable media, processing devices, etc.) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus, comprising:
   a processing core including a program counter to cycle through addresses; and
   a data storage device including computer-readable instructions stored thereon, the computer-readable instructions including sub-portions of the computer-readable instructions to instruct the processing core to execute subroutines, each sub-portion of the computer-readable instructions corresponding to one of the sub-routines, locations of the sub-portions of the computer-readable instructions within the data storage device associated with the addresses, the sub-portions including:
   a first sub-portion at a first location within the data storage device indicated by a first address; and
   first trap sub-portions at first trap locations within the data storage device, the first trap sub-portions indicated by respective first trap addresses, the first trap addresses different from the first address by only a single bit, the first trap sub-portions to instruct the processing core to execute respective first trap sub-routines to jump to one of the first address or to themselves.

2. The apparatus of claim 1, wherein the first address is a consecutive series of zeros.

3. The apparatus of claim 1, wherein the first address comprises a plurality of bits, each of the first trap addresses differing from the first address by a single respective bit.

4. The apparatus of claim 1, wherein the sub-portions include:
   a second sub-portion at a second location within the data storage device indicated by a second address, the second address a ones' complement of the first address, the first sub-portion to instruct the processing core to execute a first subroutine to jump to the second address; and
   second trap sub-portions at second trap locations within the data storage device, the second trap locations indicated by second trap addresses, the second trap addresses different from the second address by only a single bit, the second trap sub-portions to instruct the processing core to execute second trap subroutines to jump to the second address or to themselves.

5. The apparatus of claim 4, wherein one of the first address and the second address is a consecutive series of zeros and one of the first address and the second address is a consecutive series of ones.

6. The apparatus of claim 1, wherein the sub-portions include:
   a second sub-portion at a second location within the data storage device indicated by a second address, the second address a ones' complement of the first address, the first sub-portion to instruct the processing core to execute a first subroutine to jump to the second address; and
   second trap sub-portions at second trap locations within the data storage device, the second trap locations indicated by second trap addresses, the second trap addresses different from the second address by only a single bit, the second trap sub-portions to instruct the processing core to execute second trap subroutines to jump to the second address, to themselves, or to the first address.

7. The apparatus of claim 6, comprising an address bus electrically connecting the program counter to the data storage device, wherein the second trap sub-portions prevent a jump to an unknown address in the event of a single stuck-at low bit fault at one or more of the address bus or the program counter.

8. The apparatus of claim 1, comprising a watchdog timer to detect a fault of the program counter or of an address bus electrically connecting the program counter to the data storage device during run-time, the watchdog timer to initiate a reset operation responsive to detecting the fault of the program counter during run-time.

9. The apparatus of claim 8, wherein the watchdog timer is implemented independently from the subroutines.

10. The apparatus of claim 8, the watchdog timer to initiate the reset operation independently from the processing core.

11. The apparatus of claim 8, wherein the watchdog timer is implemented in hardware separate from the processing core.

12. The apparatus of claim 1, comprising an address bus electrically connecting the program counter to the data storage device, wherein the first trap sub-portions prevent a jump to an unknown address in the event of a single stuck-at high bit fault at one or more of the address bus or the program counter.

13. A system, comprising:
a processing circuit, the processing circuit comprising:
a processing core including a program counter to cycle through addresses;
a data storage device including computer-readable instructions stored thereon, the computer-readable instructions including sub-portions of the computer-readable instructions, the sub-portions to instruct the processing core to execute subroutines, the sub-portions including:
a first sub-portion at a first location within the data storage device indicated by a first address of the addresses;
first trap sub-portions at first trap locations within the data storage device, the first trap locations indicated by respective first trap addresses of the addresses, the first trap addresses different from the first address by only a single respective bit, the first trap sub-portions to instruct the processing core to execute first trap subroutines to jump to the first address or back to themselves;
a second sub-portion at a second location within the data storage device indicated by a second address of the addresses, the second address a ones' complement of the first address, the first sub-portion to instruct the processing core to execute a first subroutine to jump to the second address; and
second trap sub-portions at second trap locations within the data storage device, the second trap locations indicated by respective second trap addresses of the addresses, the second trap addresses different from the second address by only a single respective bit, the second trap sub-portions to instruct the processing core to execute second trap subroutines to jump to the second address, to themselves, or to the first address.

14. The system of claim 13, wherein numbers of the first trap sub-portions and the second trap sub-portions are each equal to a number of bits of the addresses.

15. A method of operating a processing circuit, the method comprising:
initiating cycling of addresses in a program counter with a first address corresponding to a first sub-portion of computer-readable instructions stored by a data storage device at a first location;
executing, responsive to the first address in the program counter and a first type of stuck-at fault of the program counter or of an address bus, a first trap subroutine corresponding to a first trap sub-portion of the computer-readable instructions to jump to the first address or to itself;
executing, responsive to the first address in the program counter and the address bus being free of the first type of stuck-at fault, a first sub-routine corresponding to the first sub-portion of the computer-readable instructions to jump to a second address corresponding to a second sub-portion of the computer-readable instructions at a second location of the data storage device; and
executing, responsive to the second address in the program counter and a second type of stuck-at fault of the program counter or of the address bus, a second trap subroutine corresponding to a second trap sub-portion of the computer-readable instructions to jump to the second address, to the first address, or to itself.

16. The method of claim 15, comprising executing, responsive to the second address in the program counter or of the address bus being free of the second type of stuck-at fault, a second subroutine corresponding to a second sub-portion of the computer-readable instructions to jump to a start of application address corresponding to an application sub-portion of the computer-readable instructions and an application subroutine.

17. The method of claim 15, comprising:
detecting, during a run-time of the processing circuit, a fault in operation of the processing circuit; and
resetting operation of the processing circuit responsive to the detected fault.

18. The method of claim 17, wherein detecting the fault comprises detecting a stuck-at fault of the program counter or of the address bus by one of a watchdog timer and a diagnostic test.

19. The method of claim 15, wherein the first type of stuck-at fault is a stuck-at high fault and the second type of stuck-at fault is a stuck-at low fault.

20. The method of claim 15, wherein initiating the cycling of the addresses in the program counter with the first address comprises initiating the cycling of the addresses in the program counter with the first address including a consecutive series of all zeros.

* * * * *

UNITED STATES PATENT AND TRADEMARK OFFICE
CERTIFICATE OF CORRECTION

PATENT NO. : 11,537,401 B2
APPLICATION NO. : 17/650621
DATED : December 27, 2022
INVENTOR(S) : Jacob Lunn Lassen It is certified that error appears in the above-identified patent and that said Letters Patent is hereby corrected as shown below:

In the Specification
Column 9, Line 8, change "0xDFFF, OXEFFF," to --0xDFFF, 0xEFFF,--

Signed and Sealed this
Twenty-third Day of April, 2024

Katherine Kelly Vidal
*Director of the United States Patent and Trademark Office*